US006474220B2

United States Patent
Ries

(10) Patent No.: US 6,474,220 B2
(45) Date of Patent: Nov. 5, 2002

(54) COOLING CHANNEL PISTON WITH ESPECIALLY LOW OVERALL HEIGHT

(75) Inventor: Norbert Ries, Kulsheim (DE)

(73) Assignee: KS Kolbenschmidt GmbH (DE)

( * ) Notice: Subject to any disclaimer, the term of this patent is extended or adjusted under 35 U.S.C. 154(b) by 0 days.

(21) Appl. No.: 09/809,906

(22) Filed: Mar. 16, 2001

(65) Prior Publication Data

US 2001/0027607 A1 Oct. 11, 2001

(30) Foreign Application Priority Data

Mar. 17, 2000 (DE) .......................... 100 13 395

(51) Int. Cl.[7] ............................ F01B 31/08; B23P 15/10
(52) U.S. Cl. ..................... 92/186; 92/233; 29/888.04; 29/558
(58) Field of Search .................. 29/888.04, 558; 92/186, 209, 233; 123/193.6

(56) References Cited

U.S. PATENT DOCUMENTS

| 4,608,947 A | * | 9/1986 | Stadler ................. 92/186 X |
| 5,778,533 A | * | 7/1998 | Kemnitz ............. 29/888.04 X |
| 6,026,777 A | * | 2/2000 | Kemnitz et al. ......... 123/193.6 |
| 6,202,619 B1 | * | 3/2001 | Keller et al. ............ 123/193.6 |

FOREIGN PATENT DOCUMENTS

| DE | 41 34 529 | 5/1993 |
| DE | 44 46 726 | 6/1996 |

* cited by examiner

Primary Examiner—John E. Ryznic
(74) Attorney, Agent, or Firm—Young & Basile, PC

(57) ABSTRACT

The invention relates to a process for producing a cooling channel piston, in which the overall height is reduced in that the annular recess has a lower height than the height of the tool used for producing the cooling channel, and the production of the cooling channels starts parallel to the piston boss face, in which the axial height of the annular recess (8) is smaller than the axial height of the cooling channel (13).

4 Claims, 3 Drawing Sheets

COOLING CHANNEL PISTON WITH ESPECIALLY LOW OVERALL HEIGHT

BACKGROUND

This invention relates to a process for producing a cooling channel piston, above all, for a diesel engine and a cooling channel piston produced according to said process.

This type of process is known from DE 44 46 726 A1. With the cooling channel piston known from this specification, a piston blank is produced, and an annular recess and the cooling channel, which is open towards the bottom, are inserted into the piston by means of metal cutting, and, subsequently, the outer contour of the piston is completed.

Further, the axial height of the annular recess at least matches that of the cooling channel. This is necessary, because, in order to produce a cooling channel that is open towards the bottom, a hook-shaped turning tool must be inserted into the recess, and the cooling channel must be machined in the desired shape as a result of corresponding axial and radial infeed actions. The height of the hook-shaped turning tool that is required to produce the cooling channel produces an overall height of the piston that is undesirable, since there is a trend to produce pistons that are shallower and shallower and, consequently, more compact combustion engines. In particular, because of the deep insertion of cooling channels into the piston head, the turning tool requires a channel height-increasing hook-shaped end which contributes to an undesired increase in the overall height of the piston. This means that the distance between the lower section of the piston head and the upper section of the of the piston skirt becomes undesirably high.

It is the object of the invention to avoid the above described disadvantages.

SUMMARY

The inventive process is characterized in that the annular recess is supplemented by an additional recess by means of metal cutting and the production of the cooling channel is begun in an area parallel to a face of the piston boss. By means of these procedural steps, the overall height of the piston can be reduced, because the tool which forms the cooling channel has a greater overall height than the annular recess. By means of these procedural steps, the cooling channel can be produced in the usual manner with the required geometric configuration and with respect to the volume of cooling medium to be accommodated in which, at the same time, the overall height of the piston is clearly reduced as a result of reducing the height of the annular recess. The axial height of the annular recess is thus smaller than the axial height of the cooling channel.

The inventive process and the pistons produced in accordance therewith are described in the following by means of an embodiment and the drawing figures, with the invention not being restricted to the disclosed embodiment.

DETAILED DESCRIPTION

Figure 1:
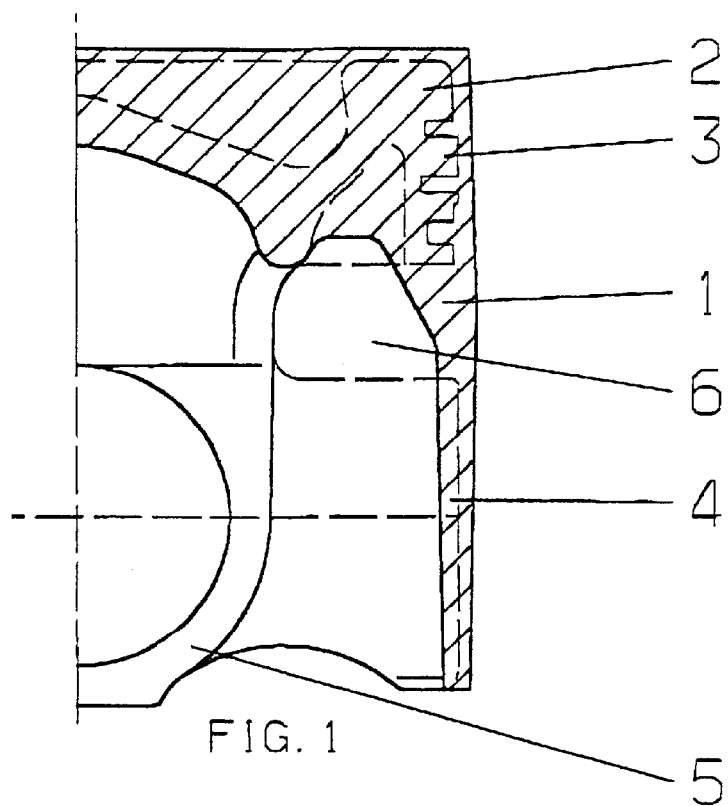
FIGS. 1 to 5 show the procedural steps by means of a sectional view of the piston.

The hatching in FIG. 1 represents a piston blank 1 which, for example, is produced during a forging process. Underneath the hatching are the contours of the complete piston, the piston essentially comprising an annular area 3 and a piston skirt 4 with piston bosses 5. A recess 6 is already produced in the blank when producing the piston blank 1.

Figure 2:
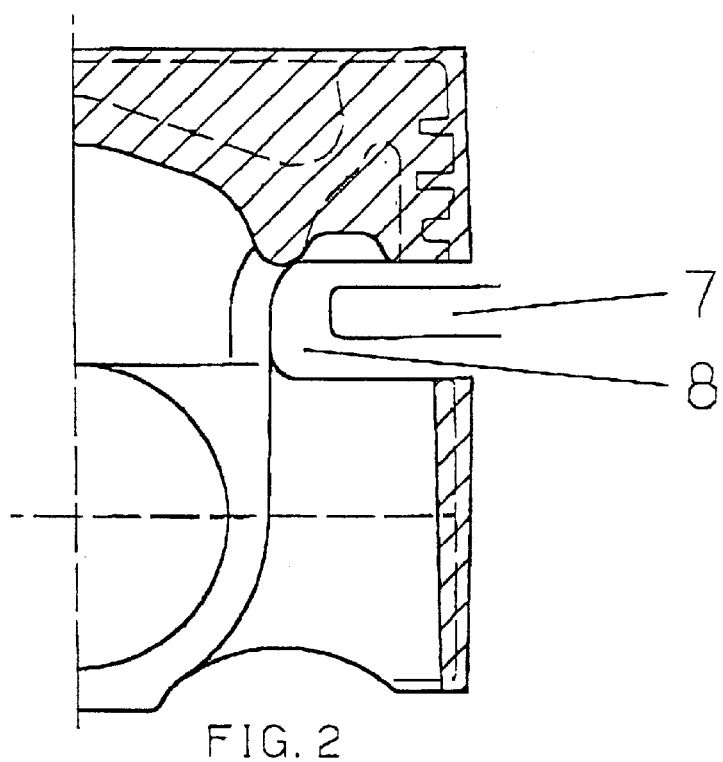

FIG. 2 shows the next procedural step, in which an annular recess 8 is inserted by means of metal cutting (for example, by turning or milling) with a first tool 7. Depending on the method by which the piston blank 1 is produced, this annular recess 8 may already have been inserted.

Figure 3:
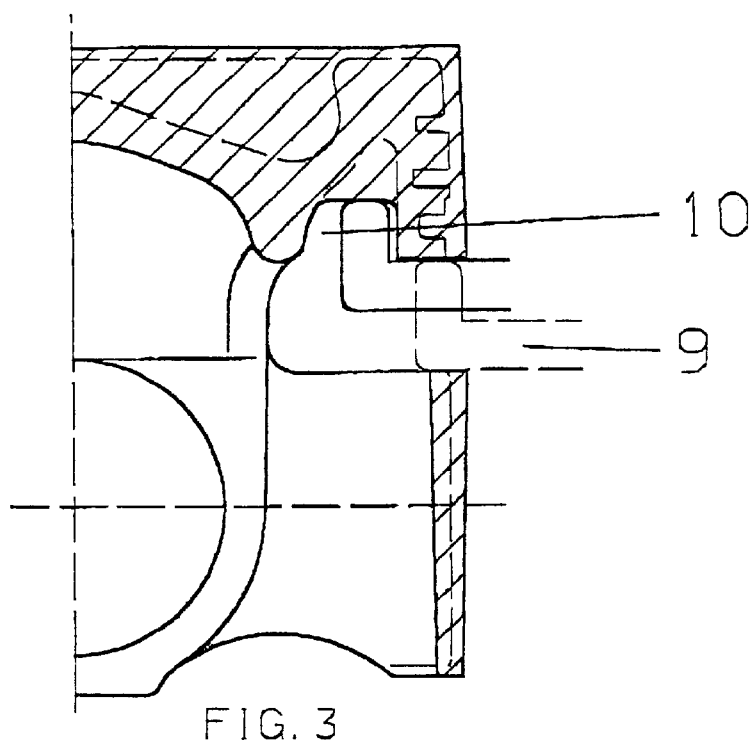

FIG. 3 shows that the annular recess 8 is supplemented by an additional recess 10 by means of a second tool 9 which is, in particular, hook-shaped. This additional recess 10 is a constituent part of the subsequent cooling channel.

Figure 4:
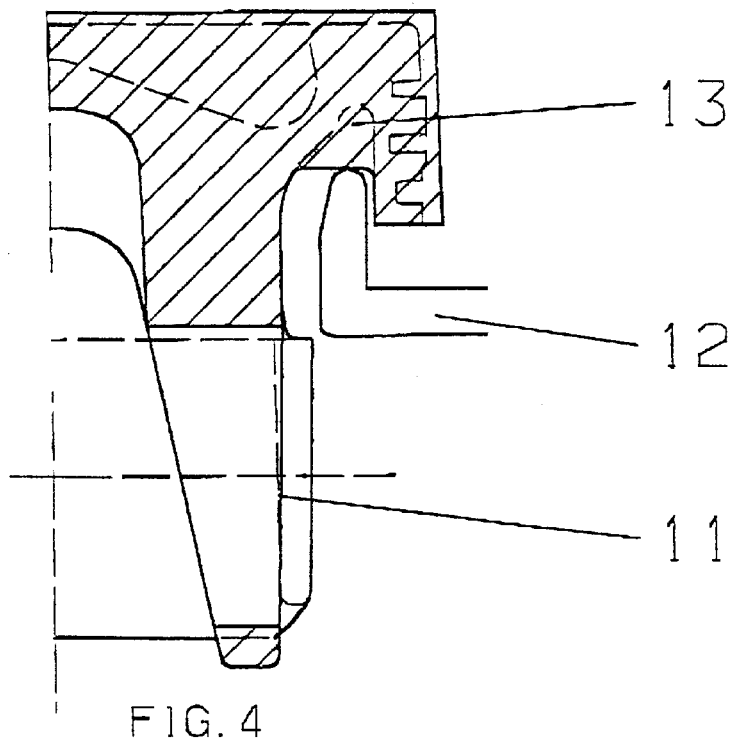

FIG. 4 shows that, after the annular recess 8 has been supplemented by the another recess 10 by means of metal cutting, production of the cooling channel can be started in an area parallel to the piston boss face 11. A third tool 12 is applied, which also has a hook-shaped design. Further, the axial height of the third tool 12 becomes greater than the axial height of the annular recess 8. As a result of applying the third tool 12 adjacent to the piston boss face 11 (when viewing FIG. 4), the end area of the of the third tool 12 can easily be applied behind the projection of the annular land 3 (FIG. 1). The final shape of the cooling channel 13 can be produced by the radial and axial infeed of the tool 12 (or piston). For this purpose, the piston can either be inserted while rotating it and the tool 12 fed axially and radially, or, as an alternative, it is possible to put the tool 12 in rotational motion and to feed the tool 12 radially and axially, while the piston remains fixed. The axial height of the cooling channel 13 extends from the lower edge of the annular lands 3 to the piston head 2, and is designated HK in FIG. 5 for the sake of better clarification. The axial height of the recess 8 is designated HA. According to the adjacent system of coordinates, the axial extension is designated Y, and the radial extension is X.

After producing the cooling channel 13, the piston must be so positioned that the tool 12 can be removed from the cooling channel 13 parallel to the piston boss face 11, in the Y direction.

Figure 5:
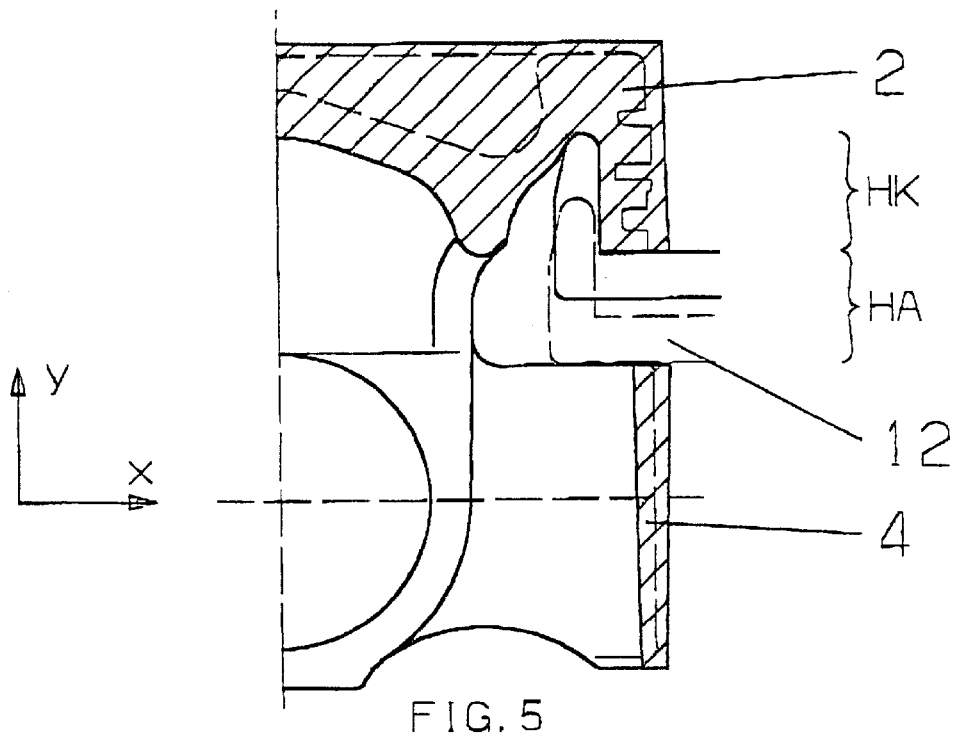
Figure 6:
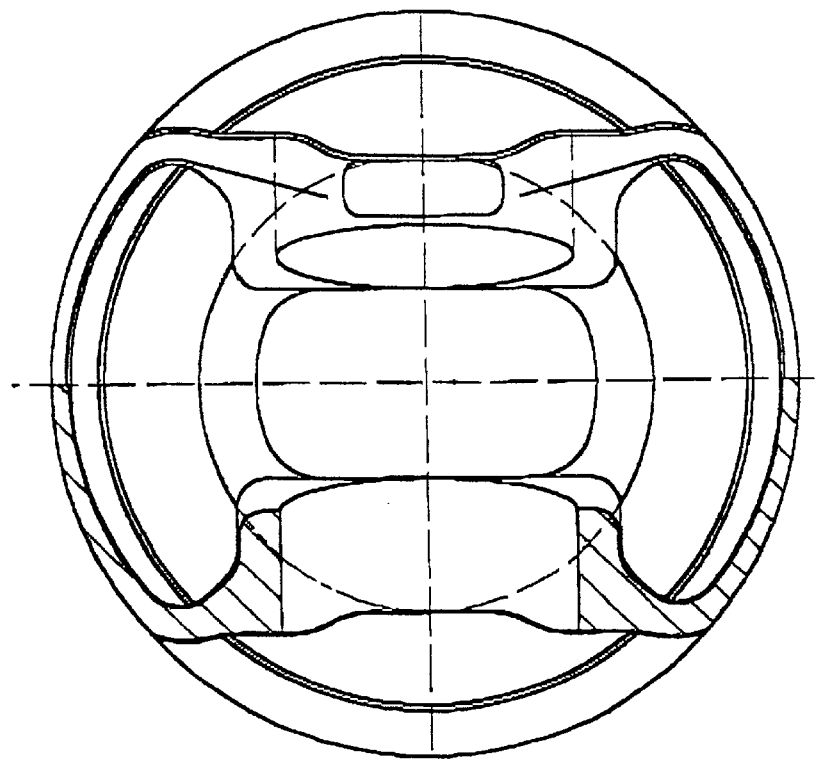
FIG. 6 shows a bottom view of the completed piston.

FIG. 5 shows the movements of the tool in the Y direction, in order to produce the cooling channel 13. The shape of the cooling channel can be randomly determined in specific areas by means of a corresponding axial and radial infeed in the X direction or Y direction.

After removing the tool 12, which is positioned in the piston, from the completed cooling channel 13 as shown in FIG. 4, the external contour of the piston can be completed, unless this has already been done.

Following these processing steps, the completed cooling channel 13, which is open towards the bottom, must be closed.

What is claimed is:

1. A process for producing a one-piece cooling channel piston having a continuous annular, closed cooling channel inside a piston head, an annular recess provided between the piston head and a piston skirt, the piston skirt connected to piston bosses attached to the piston head, comprising the steps of:
   producing a piston blank;
   forming the annular recess and the cooling channel, which is open towards the bottom, in the piston blank by means of metal cutting;
   completing an outer contour of the piston;
   closing the cooling channel which is open towards the bottom;

forming an axial height of the cooling channel larger than an axial height of the annular recess;

forming an additional recess to the annular recess by means of metal cutting; and starting the production of the cooling channel in an area parallel to a face of the piston boss face.

2. The process as defined in claim 1, further comprising the steps of:

positioning a tool in an area parallel to a face of the piston boss face; and putting the piston into rotational motion, with a continuous infeed of the tool.

3. The process as defined in claim 1, further comprising the steps of:

positioning a tool in an area parallel to a face of the piston boss face; and putting the tool into rotational motion, with a continuous infeed of the tool.

4. A one-piece cooling channel piston including a continuous annular, closed cooling channel provided inside a piston head, and an annular recess provided between the piston head and the piston skirt, in which the piston skirt is connected to the piston bosses attached to the piston head, produced according to the process of claim 1, an axial height of the cooling channel being greater than an axial height of the annular recess.

* * * * *